(12) United States Patent
He et al.

(10) Patent No.: US 8,516,213 B2
(45) Date of Patent: Aug. 20, 2013

(54) METHOD AND APPARATUS FOR EEPROM EMULATION FOR PREVENTING DATA LOSS IN THE EVENT OF A FLASH BLOCK FAILURE

(75) Inventors: Chen He, Austin, TX (US); Richard K. Eguchi, Austin, TX (US); Daniel Hadad, Austin, TX (US); Katrina M. Prosperi, Austin, TX (US); Jon W. Weilemann, II, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 348 days.

(21) Appl. No.: 12/954,130

(22) Filed: Nov. 24, 2010

(65) Prior Publication Data

US 2012/0131262 A1    May 24, 2012

(51) Int. Cl.
*G06F 13/00* (2006.01)
(52) U.S. Cl.
USPC ............ 711/166; 711/114; 711/154; 711/165
(58) Field of Classification Search
USPC .......................................... 711/103, 154, 166
See application file for complete search history.

(56) References Cited

U.S. PATENT DOCUMENTS

| | | | |
|---|---|---|---|
| 6,904,400 B1* | 6/2005 | Peri et al. | 703/28 |
| 7,058,755 B2 | 6/2006 | Nallapa | |
| 7,406,558 B2 | 7/2008 | Przybylek | |
| 2005/0055496 A1* | 3/2005 | Nallapa | 711/103 |
| 2006/0282610 A1 | 12/2006 | Dariel et al. | |
| 2007/0143528 A1 | 6/2007 | Przybylek | |
| 2009/0168541 A1 | 7/2009 | Eguchi et al. | |
| 2010/0074005 A1* | 3/2010 | Parker | 365/185.03 |
| 2010/0250875 A1 | 9/2010 | Leung et al. | |

OTHER PUBLICATIONS

M. Gallop et al., Freescale Semiconductor, Overview of the MC9S12XE Emulated EEPROM, Document No. AN3490, Rev. 0, Sep. 2007.
Motorola, EEPROM Emulation with MPC5500 Family Microcontrollers, Application Note AN2445/D Rev. 0, Jan. 2003.
McGinty et al., U.S. Appl. No. 12/473,934, filed May 28, 2009, entitled Method and Circuit for Brownout Detection in a Memory System.

\* cited by examiner

*Primary Examiner* — Reba I Elmore
(74) *Attorney, Agent, or Firm* — Terrile, Cannatti, Chambers & Holland, LLP; Michael Rocco Cannatti (57) ABSTRACT

A defect resistant EEPROM emulator (110) uses one or more redundant and/or spare blocks (213) in addition to active and alternate blocks (211, 212) and stores a duplicate copy of EEPROM data records either in the active and redundant blocks or in duplicate rows in the active block to ensure that EEPROM emulation can continue without data loss in the event a catastrophic failure occurs within a block.

23 Claims, 6 Drawing Sheets

METHOD AND APPARATUS FOR EEPROM EMULATION FOR PREVENTING DATA LOSS IN THE EVENT OF A FLASH BLOCK FAILURE

BACKGROUND OF THE INVENTION

1. Field of the Invention

The present invention is directed in general to flash memories and methods for operating same. In one aspect, the present invention relates to a system and method of using flash memory blocks to emulate Electrically Erasable Programmable Read Only Memory (EEPROM).

2. Description of the Related Art

Electrically erasable, programmable, read-only memory (EEPROM) is a type of non-volatile memory (NVM) used with microcontrollers, microprocessors, computers and other electronic devices (such as automotive embedded controllers) to store data. EEPROM is typically characterized by the ability to erase and write individual bytes of memory many times over, with programmed locations retaining their data over an extended period when the power supply is removed. However, because of the increased cost and size requirements for EEPROM memories, it is more economical to use sector or block erasable flash memory to emulate EEPROM functionality. Flash memory can also be programmed by byte or word, but has the restriction that it may only be erased by block, where each block typically contains several kilobytes of memory. This restriction on the erase mechanism reduces the silicon area required, and allows much larger memory arrays to be implemented compared to byte erasable EEPROM. However, there continue to be challenges with overcoming flash memory latent defects that that may result in a flash operation failure after extensive program and erase cycles. Specifically, a typical flash memory failure mode arises when a bit blows up and shorts the word line, resulting in failure of any operations which select that row or even the entire block being disabled. When such failures occur, the row will fail to read or program and the flash block may fail to erase. Conventional EEPROM emulation techniques cannot handle such failures during flash operations, and application data stored in the emulated EEPROM will likely to be lost when such failures occur, thereby leading to catastrophic failure.

Accordingly, a need exists for an improved EEPROM emulation scheme that overcomes the problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

A method, system and apparatus are described for performing EEPROM emulation to prevent data loss in the event of a flash block failure by using redundant and/or Spare Blocks and/or dedicated rows to store redundant copies of the EEPROM data records, thereby allowing EEPROM emulation to continue without data loss in the event of catastrophic flash operation failure within a block. In selected embodiments, a flash memory may be used to perform EEPROM emulation by allocating flash array operations (read, program, erase) in three or more blocks (Active, Alternate, Redundant, and/or Spare Blocks if available). To this end, an EEPROM emulation driver, state machine, and/or firmware (EE emulation module) is provided which controls the flash array operations to program EEPROM data into two separate memory blocks (e.g., Active and Redundant Blocks) so that a "backup" copy of the EEPROM data can be retrieved if there is a block failure in either of the separate memory blocks. The EE emulation module may further control the flash array operations with a round robin EEPROM emulation scheme to implement a wear-leveling algorithm which assigns the flash memory blocks to distribute the number of write cycles among the flash memory blocks. In this way, redundant/spare flash blocks are used to keep redundant copies of the EEPROM data records, enabling seamless continuation of the EEPROM emulation without data loss even in case of flash operation failures. In other embodiments, EEPROM emulation is performed by allocating flash array operations (read, program, erase) in at least three blocks (Active, Alternate, and Spare Blocks) so that each block includes two rows for each data record, including a dedicated record row and a redundant row. With this configuration, data records are updated along the duplicate rows such that a "backup" copy of the EEPROM data can be retrieved if there is a row failure in either of the rows. And when such row failure occurs, the EEPROM data in the failing block will be copied to a Spare Block and the failing block will be removed from EEPROM emulation and replaced by the Spare Block.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. Some portions of the detailed descriptions provided herein are presented in terms of algorithms and instructions that operate on data that is stored in a computer memory. Such descriptions and representations are used by those skilled in the art to describe and convey the substance of their work to others skilled in the art. In general, an algorithm refers to a self-consistent sequence of steps leading to a desired result, where a "step" refers to a manipulation of physical quantities which may, though need not necessarily, take the form of electrical or magnetic signals capable of being stored, transferred, combined, compared, and otherwise manipulated. It is common usage to refer to these signals as bits, values, elements, symbols, characters, terms, numbers, or the like. These and similar terms may be associated with the appropriate physical quantities and are merely convenient labels applied to these quantities. Unless specifically stated otherwise as apparent from the following discussion, it is appreciated that, throughout the description, discussions using terms such as "processing" or "computing" or "calculating" or "determining" or "displaying" or the like, refer to the action and processes of a computer system or similar electronic computing device, state machine, electronic circuit, logic, firmware, application specific integrated circuit (ASIC), or computing circuitry or module that manipulates and transforms data represented as physical (electronic) quantities within the computer system's registers and memories into other data similarly represented as physical quantities within the computer system memories or registers or other such information storage, transmission or display devices.

Figure 1:
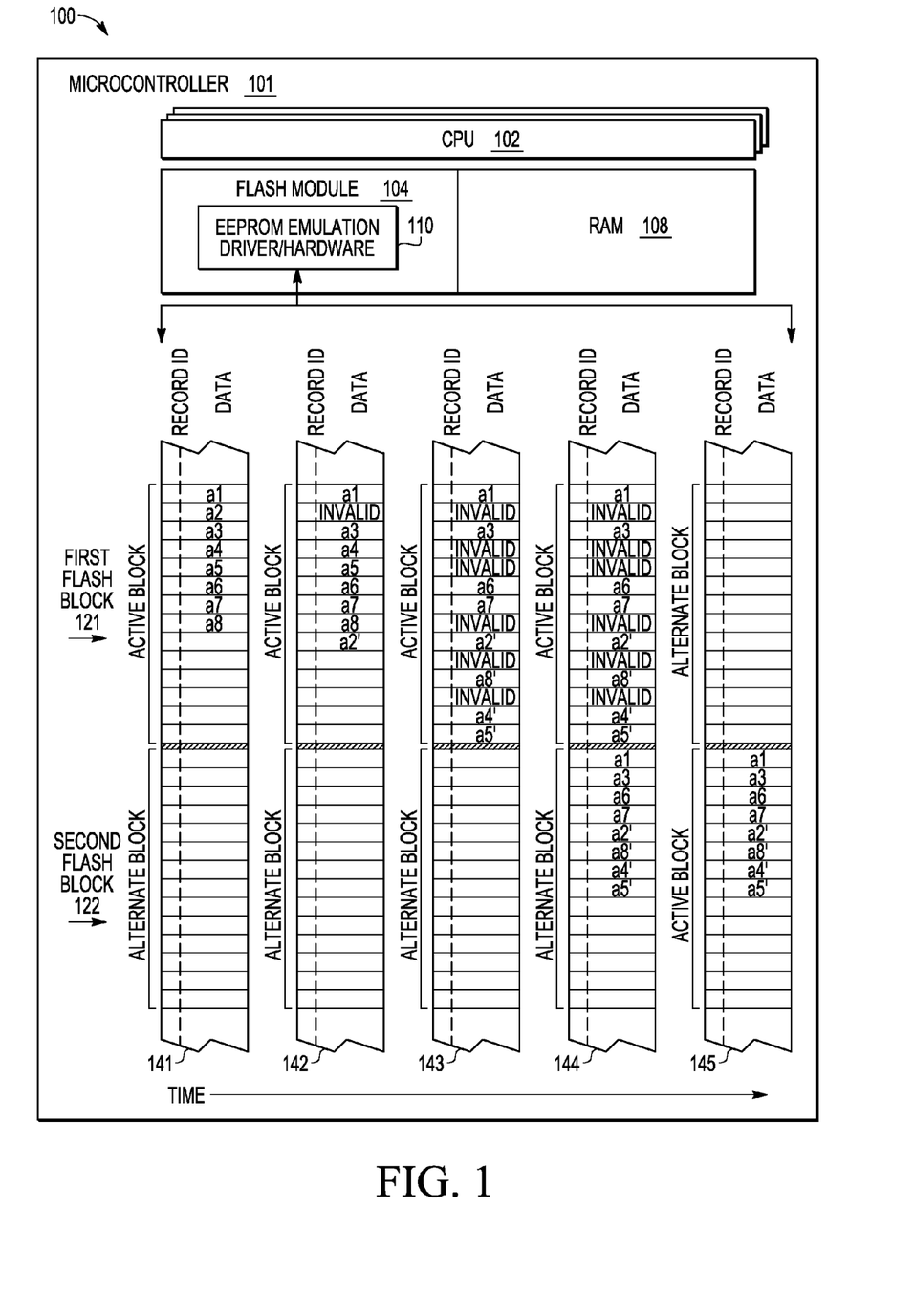
FIG. 1 is a schematic block diagram of a microcontroller architecture which implements an emulated EEPROM with a plurality of blocks.

Referring now to FIG. 1, there is depicted a schematic block diagram of a system architecture 100 which implements an emulated EEPROM with a plurality of flash memory blocks for storing one or more EEPROM data records. For present purposes, an EEPROM data record refers to a collection of data items or fields arranged for processing as if stored in an EEPROM, and may include a data record status field, a data record ID field, a data size field and one or more data fields. The specific arrangement of the EEPROM data record is prescribed by the application program that processes it, and may include both fixed-length and variable length records. In operation, EEPROM data records that are to be processed by the application program and executed on the CPU are made active. As will be appreciated, the EEPROM emulation system architecture 100 may be implemented as a standalone flash module having its own processing functionality or with microcontrollers, microprocessors, computers and other electronic devices which use flash memory to emulate EEPROM memory. In an example embodiment, the EEPROM emulation system architecture 100 is implemented with a microcontroller 101 (e.g., an embedded automotive controller) that includes one or more CPU or processor cores 102 coupled over one or more busses (not shown) to memory storage devices, such as a flash memory module 104, and/or random access memory (RAM) 108, depending on the type of data being stored. For example, an EEPROM memory would conventionally be used to store data (e.g., diagnostic data, adaptive control data, and/or security data) that is written frequently during the microcontroller lifetime, requiring a high program/erase endurance of many thousand cycles. But size and cost restraints associated with EEPROM memory may dictate that the separate EEPROM not be implemented and flash memory be used to store data typically stored in EEPROM memory. On the other hand, the different characteristics of flash memory (block/sector erasable as compared to true byte or word erasable EEPROM) pose a number of challenges to using flash memory, including the requirement that data updates meet the erase size restrictions of flash memory and the more limited program/erase endurance and data retention characteristics of flash memory.

To overcome these challenges with using flash memory to emulate EEPROM memory, the flash memory module 104 includes an EEPROM emulation module 110 which provides the functionality of EEPROM memory while masking the restrictions of the actual flash array 104. Implemented as software, hardware, firmware or any combination of the foregoing, the EEPROM emulation module 110 provides the flash memory 104 with emulated EEPROM functionalities, such as organizing data records, initializing and de-initializing EEPROM, reporting EEPROM status, and reading, writing, and deleting data records. In any software implementation, the software may be executed by a separate processor (e.g., 102) or by a processor or controller (not shown) in the flash module 104. Whether implemented with firmware, hardware or software EEPROM emulation controller, EEPROM emulation with redundancy protection is implemented by designating a plurality of flash memory blocks to store both active data records and redundant data records using a round-robin block swapping scheme whereby initially designated blocks are re-designated when the active block is full or when a bad block is detected. If implemented in software, the EEPROM emulation controller/driver may allow a customer's EEPROM application software to use the EEPROM emulation controller to select which flash blocks to be used for EEPROM emulation and pass that into the EEPROM emulation controller/driver. If implemented by firmware/hardware, the flash blocks used for EEPROM emulation may be predetermined and not variable for a customer's application. In either case, once the flash blocks are selected for EEPROM emulation, any designation or re-designation of these blocks to be active, alternate, redundant, and/or spare blocks will all be done by the firmware/hardware or software EEPROM controller.

At a basic level, the EEPROM emulation module 110 provides EEPROM emulation by using two blocks or clusters of flash memory 121, 122 to define Active and Alternate Blocks. The blocks 121, 122 are allocated in the flash array as non-overlapping blocks that need not be contiguous. The operation of the flash blocks 121, 122 to provide basic EEPROM emulation is depicted in FIG. 1 by illustrating the EEPROM emulation data programming steps 141-145 in the blocks 121, 122 over time. In an initial stage (indicated with initial flash configuration 141), EEPROM data is programmed into the first flash block 121 that is designated as the Active Block by the EEPROM emulation module 110, while the second flash block 122 is designated as the Alternate Block. Initially programmed as a plurality of contiguous records (e.g., a1-a8), each record includes a record ID field and an associated EEPROM data field. In various embodiments, the record ID field stores file system information, including but not limited to data record status information. To simplify operations, the EEPROM emulation module 110 may adopt fixed length data records so that each record will have the same data length.

Because the flash memory cells cannot be erased individually, the EEPROM emulation module 110 must write a new data record with the same data ID and updated value when the data needs updating. Thus, instead of updating a data record directly on the same location, data write operations are implemented by programming the record at the next available or empty flash location with the new value and associated data ID value. In FIG. 1, a first write stage (indicated with flash configuration 142) shows that a new EEPROM data value a2' is programmed into the Active Block as a new record in the first flash block 121, and then the original record location for EEPROM data value a2 has been invalidated. Invalidating an old data record can be implemented by updating the record status field, which can be done without the requirement to erase the flash block. With this approach, there will be several data records in the Active Block with same data ID (because of data updating), so the reading routine should identify the latest copy of the data record by scanning the entire active cluster from the first data record to the blank region, and checking the latest valid one as the final value of specific data. Depending on the record update and search scheme, invalidating old data records can be optional in the EEPROM emulation implementation. Invalidating old data records can help speed up the data record search process and hence improve EEPROM data read performance. For clear illustration, in this application we assume old data records are always invalidated.

After updating several times, the Active Block may become full or not have enough free space to write a new data record. In FIG. 1, this indicated with flash configuration 143 which shows that at least the original record locations for EEPROM data values a4, a5, and a8 have been invalidated, and that new EEPROM data values a4', a5' (which might be already updated more than once), and a8' are programmed into the Active Block as new records in the first flash block 121.

The EEPROM emulation module 110 determines the Active Block is full or does not have sufficient space to hold a new data record, and then performs the block swapping procedure (indicated with flash configurations 144 and 145). As the first step of block swapping, the latest data records from the Active Block in the first flash block 121 are copied to the Alternate Block in the second flash block 122 to clean up the EEPROM data. In FIG. 1, this is represented by the swap stage (indicated with flash configuration 144) which shows that the current EEPROM data values a1, a3, a6, a7, a2', a8', a4', and a5' have been copied into the Alternate Block (the second flash block 122). Afterwards and as indicated with flash configuration 145, the EEPROM emulation module 110 erases the old Active Block (the first flash block 121) and switches the block designations so that the Alternate Block becomes the new Active Block, and vice versa. In this way, the "used" flash block 121 is reclaimed, the EEPROM data are compressed with only latest valid copies left in the new Active Block, and the program/erase cycles are evenly distributed across the flash blocks used for EEPROM emulation. As a result, the number of effective erase cycles seen by each flash block has been significantly reduced (proportional to the ratio between the flash block size and the EEPROM data size).

As will be appreciated, during the emulated EEPROM operations, if either of the Active or Alternate Block has a bit that blows up and shorts the word line for that bit, any flash read, program or erase operation which selects that row will fail or even the entire flash block will be disabled. When this happens, the above described EEPROM emulation scheme will likely lose data or completely stop working. To overcome this limitation, selected embodiments of the present invention provide for a Redundant Block of flash memory which is controlled by the EEPROM emulation module 110 to provide EEPROM emulation. To illustrate this EEPROM emulation scheme, reference is made to FIG. 2 which illustrates an EEPROM emulation scheme using three blocks or clusters of flash memory 211, 212, 213 to provide redundant data backup. These blocks are allocated in the flash array as non-overlapping blocks that need not be contiguous.

Figure 2:
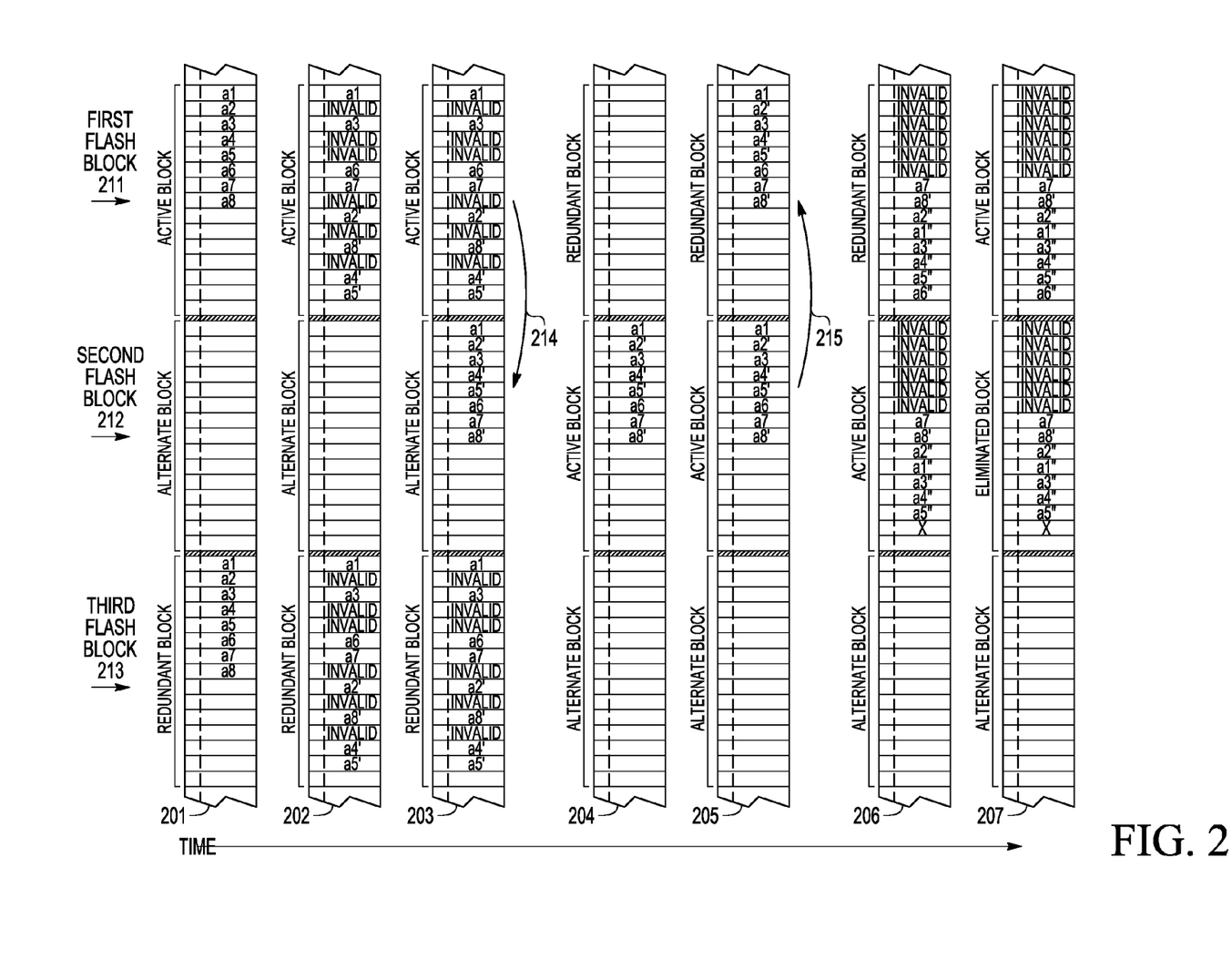
FIG. 2 illustrates an EEPROM emulation scheme using three blocks to provide redundant data backup.

To facilitate EEPROM emulation with redundant data protection, the EEPROM emulation module 110 defines the flash blocks 211, 212, 213 as Active, Alternate, and Redundant Blocks in which EEPROM data is programmed over time 201-207. In an initial stage (indicated with initial flash configuration 201), EEPROM data is programmed into the Active Block (e.g., first flash block 211) as a plurality of contiguous records (e.g., a1-a8) by the EEPROM emulation module 110. In addition, the EEPROM emulation module 110 duplicates the same EEPROM data (e.g., a1-a8) into at least a first Redundant Block (e.g., third flash block 213), and designated the second flash block 212 as the Alternate Block. This duplicate programming operation occurs on a data record basis, whereas the redundant data record is immediately programmed after the active data record is programmed, so as to minimize the risk of losing data due to a bit failure. As a result, data written into the Active Block are duplicated into the Redundant Block(s).

After, updating several times, the Active Block and Redundant Block become full or do not have sufficient space to hold a new data record. In FIG. 2, this is indicated with flash configuration 202 which shows that at least the original record locations for EEPROM data values a2, a4, a5, and a8 have been invalidated, and that new EEPROM data values a2', a4', a5', and a8' are programmed into the Active Block and the Redundant Block as new records in the first and third flash blocks 211, 213, respectively. Flash configuration 202 shows that there is space remaining in the Active Block 211 to indicate that there is not sufficient space to hold a new data record, but it will be appreciated that the Active Block and Redundant Block can instead be determined to be full when the last record space in the Active Block is taken.

Upon determining that the Active and Redundant Blocks are full, the EEPROM emulation module 110 performs the block swapping procedure, which first programs the current valid records into the Alternate Block (e.g., second flash block 212). In FIG. 2, this is indicated with flash configuration 203 which shows that the current EEPROM data records (e.g., a1, a3, a6, a7, a2', a8', a4', a5') have been copied 214 into the Alternate Block (he second flash block 212). Note that the records can be either programmed into the Alternate Block as sorted by their IDs (as shown in FIG. 2), or following the original order in the Active Block (as shown in FIG. 1). Though shown as being copied 214 from the Active Block, the current EEPROM data records may instead be copied from the Redundant Block.

Subsequently, the EEPROM emulation module 110 erases the Active and Redundant Blocks and changes the block assignment designations (as indicated with flash configuration 204). With a round robin assignment mechanism, the Active Block is designated as the new Redundant Block, the Alternate Block is designated as the new Active Block, and the Redundant Block is designated as the new Alternate Block.

After redesignating the blocks, the EEPROM emulation module 110 duplicates the Active Block data records into the new Redundant Block. In FIG. 2, this is represented by the duplication stage (indicated with flash configuration 205) where the new Redundant Block (e.g., first flash block 211) is programmed 215 with a duplicate copy of the EEPROM data (e.g., a1, a2', a3, a4', a5', a6, a7, and a8') that is in the currently designated Active Block (e.g., second flash block 212). At this point, the EEPROM emulation operation continues to operate substantially as described with flash configurations 201-205 by incrementally updating the Active and Redundant Blocks until filled, and then programming the current data records into the Alternate Block and the new Redundant Block for so long as no program, erase or read failures are detected in the Active and Redundant Blocks. An alternative implementation to configuration 204 and 205 (not shown in FIG. 2) is to first erase the old Active Block 211 and redesignate it as the new Redundant Block, and then copy the latest valid records from the new Active Block 212 to it, and then erase the old Redundant Block 213 and redesignate it as the new Alternate Block. Although this implementation might be more complex, it will ensure there are always two redundant copies of the latest valid data records during EEPROM emulation.

Upon detecting a failure to program, erase or read data in either the Active Block or Redundant Block, the EEPROM emulation module 110 eliminates the block where the failure occurred from device operation and transfers the data operation to the remaining two blocks for operation in block pair EEPROM emulation mode as shown in FIG. 1. For example, FIG. 2 shows an update flash configuration 206 after a number of record updates have been performed, resulting in invalidation of the first six records and programming of updated records a7, a8', a2", a1", a3", a4", a5", and a6", where " indicates that one or more additional updates have occurred for the data record. As indicated with the "x" in the second flash block 212, the EEPROM emulation module 110 detects a program failure in the Active Block when the new EEPROM data value a6" is being programmed into the Active and Redundant Blocks. In this case, the new EEPROM data value a6" is successfully programmed into the Redundant Block (in the first flash block 211), but not into the Active Block (in the second flash block 212).

After detecting a bad block in either the Active or Redundant Blocks, the EEPROM emulation module 110 eliminates the bad block from the round robin block selection scheme. Since the entire failing flash block may fail for any read or program or erase operation, the elimination shall be implemented by updating the block failing flags stored in a nonvolatile location other than the flash blocks being used for EEPROM emulation, such as in reserved locations in a different flash block. That is, a predetermined number of locations are reserved in a flash block outside the EEPROM emulation blocks and used to maintain a flag for each flash block used for EEPROM emulation. Each flag may be initialized to a value indicating the corresponding flash block is good to use, and monitored during the EEPROM emulation. When a failure in one flash block used in EEPROM emulation is detected, the corresponding block failing flag is updated to eliminate it from further EEPROM emulation operation. Since there is a "backup" copy of all the valid active records/parameters from the functional block where the error did not occur (e.g., the Redundant Block in the first flash block 211), this EEPROM emulation method will prevent data loss that would otherwise occur. In FIG. 2, this is indicated with flash configuration 207 where the Active Block is now designated an Eliminated Block and the Redundant Block is now designated as the new Active Block. Thus, for the three-block case shown in FIG. 2, when the Active Block 212 is failing at flash configuration 206, it can simply be eliminated from the round-robin block swapping procedure, and the old Redundant Block 211 can be designated as the new Active Block without redesignating the old Alternate Block 213 so as to continue with the standard block-pair scheme.

At this point at flash configuration 207, the EEPROM emulation module 110 no longer has a Redundant Block available for flash operations, so the EEPROM emulation module 110 reverts to block pair EEPROM emulation mode as shown in FIG. 1. FIG. 2 (configuration 207) shows one example in which the Active Block fails and is eliminated from EEPROM emulation. If instead of the Active block failing as in flash configuration 206, the Redundant Block fails for flash operation during EEPROM emulation (not shown), the valid data records will still exist in the Active Block, so the Redundant Block is simply eliminated and the EEPROM emulation continues with the current Active and Alternate Blocks. If the Alternate Block fails for flash operation during EEPROM emulation, the valid data records exist in both the Active and Redundant Blocks. So the Alternate Block is eliminated, and the Redundant Block is erased and designated as the new Alternate Block.

As described hereinabove, the EEPROM emulation memory uses a redundant block to duplicate the EEPROM data in two functional blocks until a failed flash operation is detected in one of the functional blocks in the flash array. Once the bad block is detected, the EEPROM emulation module eliminates the bad block and enters a standard block pair EEPROM emulation scheme. To eliminate the bad block, the EEPROM emulation module may store an indicator as block status information in another part of memory not used for EEPROM emulation (e.g., shadow flash or a different flash block) so that the EEPROM emulation module 110 can keep track of the bad block. While a single redundancy block provides backup protection in the event of a single bad block, the redundancy protection scheme can be further extended by adding one or more additional/spare flash memory blocks to the EEPROM emulation memory.

Figure 3:
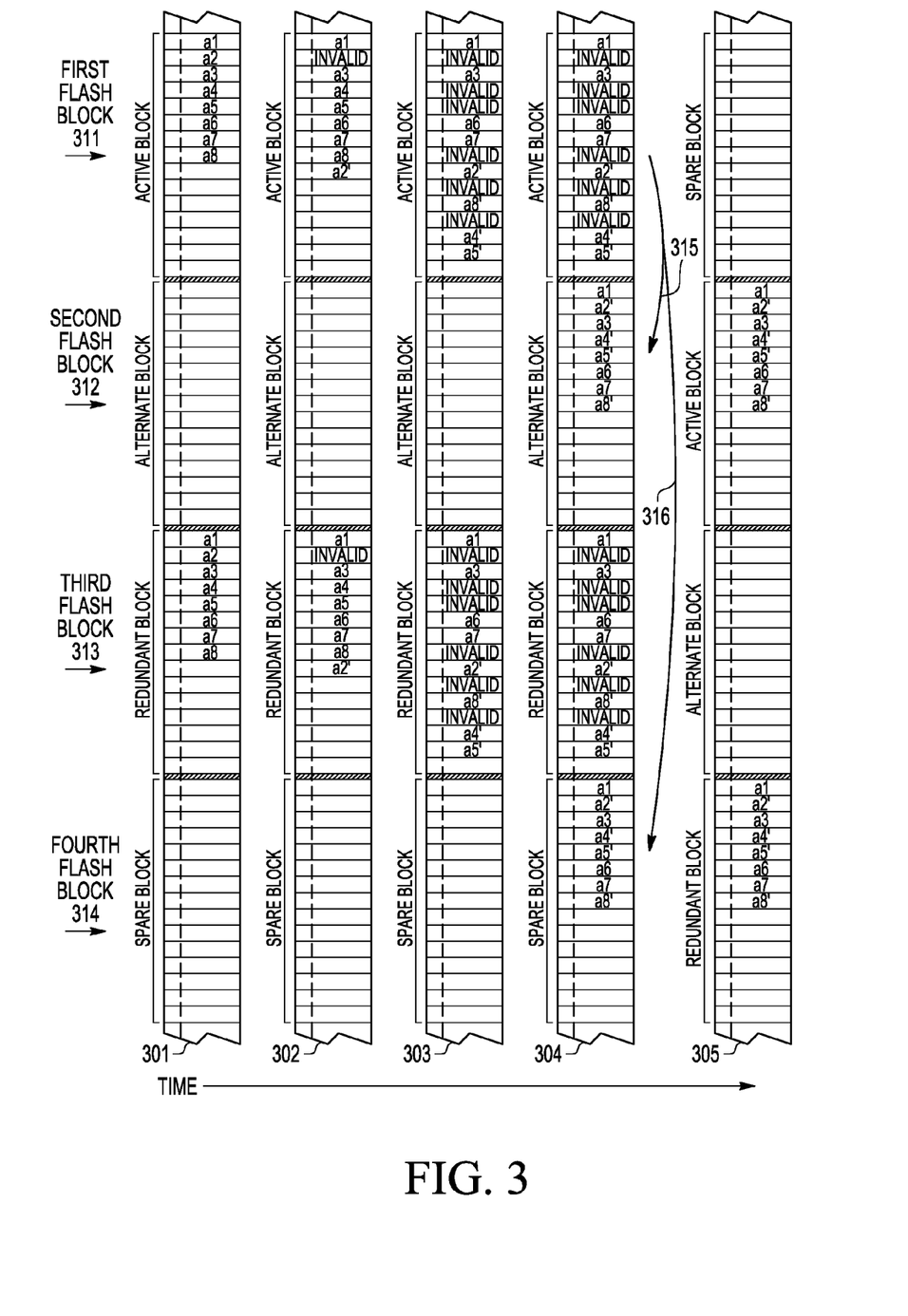
FIG. 3 illustrates an EEPROM emulation scheme using four blocks to provide redundant data backup.

To illustrate an example embodiment for extending the redundancy protection with one or more additional/spare flash memory blocks, reference is now made to FIG. 3 which illustrates an EEPROM emulation scheme using four blocks 311-314 to provide redundant data backup. These blocks are allocated in the flash array as non-overlapping blocks that need not be contiguous. In the extended redundancy mode, the EEPROM emulation module 110 defines multiple flash blocks 311-314 as Active, Alternate, Redundant, and one or more Spare Blocks. Over time 301-305, EEPROM data is programmed to spread flash operation cycles out across multiple blocks 311-314 so that a plurality of blocks can fail before the flash module switches to block pair EEPROM emulation.

In an initial stage (indicated with initial flash configuration 301), EEPROM data is programmed into the Active Block (e.g., first flash block 311) and the Redundant Block (e.g., third flash block 313) as a plurality of records (e.g., a1-a8). In addition, the EEPROM emulation module 110 designates an Alternate Block (e.g., second flash block 312), and one or more Spare Blocks (e.g., fourth flash block 314). In the normal mode of operation before any bad blocks are detected, the current functional blocks (e.g., blocks 311, 313 in flash configuration 302) are updated with EEPROM data records as indicated with flash configuration 302 which shows that the original record locations in the functional blocks for EEPROM data value a2 have been invalidated, and that new EEPROM data value a2' is programmed into the functional blocks as new records in the first and third flash blocks 311, 313, respectively. As the update process continues, the functional blocks become full or not have sufficient space to hold a new data record. In FIG. 3, this is represented by the subsequent write stage (indicated with flash configuration 303) which shows that at least the original record locations for EEPROM data values a2, a4, a5, and a8 have been invalidated, and that new EEPROM data values a2', a4', a5', and a8' are programmed into the functional blocks as new records in the first and third flash blocks 311, 313, respectively.

Upon determining that the functional blocks are full, the EEPROM emulation module 110 performs the block swapping procedure, which first programs the current valid records/parameters into the Alternate Block (e.g., second flash block 312). In FIG. 3, this is indicated with flash configuration 304 which shows that the current EEPROM data record values (e.g., a1, a3, a6, a7, a2', a8', a4', a5') have been copied 315 into the Alternate Block (the second flash block 312) and have also been copied 316 into the Spare Block (the fourth flash block 314). Though shown as being copied 315, 316 from the Active Block, the current EEPROM data records may instead be copied from the Redundant Block.

The EEPROM emulation module 110 then erases the Active and Redundant Blocks (e.g., blocks 311, 313 in flash configuration 305) and changes the block assignment designations using a predetermined round robin assignment mechanism In an example round robin assignment scheme shown in FIG. 3, the Active Block is designated as the new Spare Block, the Alternate Block is designated as the new Active Block, the Redundant Block is designated as the new Alternate Block, and the Spare Block is designated as the new Redundant Block. However, other assignment mechanisms can be used to implement any desired wear-leveling algorithm which assigns the flash memory blocks 311-314 to distribute the number of write cycles for so long as no bad block is detected.

With the additional Spare Block(s), the redundancy scheme can be extended in the event that a bad block is detected in either of the functional Active or Redundant Blocks (not shown). In such a case, the EEPROM emulation module 110 eliminates the bad block from the flash block rotation, and designates the Redundant Block as the new Active Block if the Active Block is the failing block. In addition, the EEPROM emulation module 110 designates the Spare Block as the new Redundant Block and programs a duplicate copy of the EEPROM data records into the new Redundant Block. The extended redundancy process is repeated as additional bad blocks are detected until there are no longer any Spare Block available for substitution. At this point, the EEPROM emulation module 110 reverts to the three flash block (Active, Alternate and Redundant) EEPROM emulation mode as shown in FIG. 2. If an additional block is detected to fail, the EEPROM emulation process reverts to the standard block pair (Active Block/Alternate Block) EEPROM emulation mode. As seen from the foregoing, the round robin allocation scheme may be used to spread out cycles across four or more blocks, including the Active, Alternate, Redundant, and one or more Spare Blocks, thereby allowing EEPROM emulation to continue even when two or more blocks fail.

Figure 4:
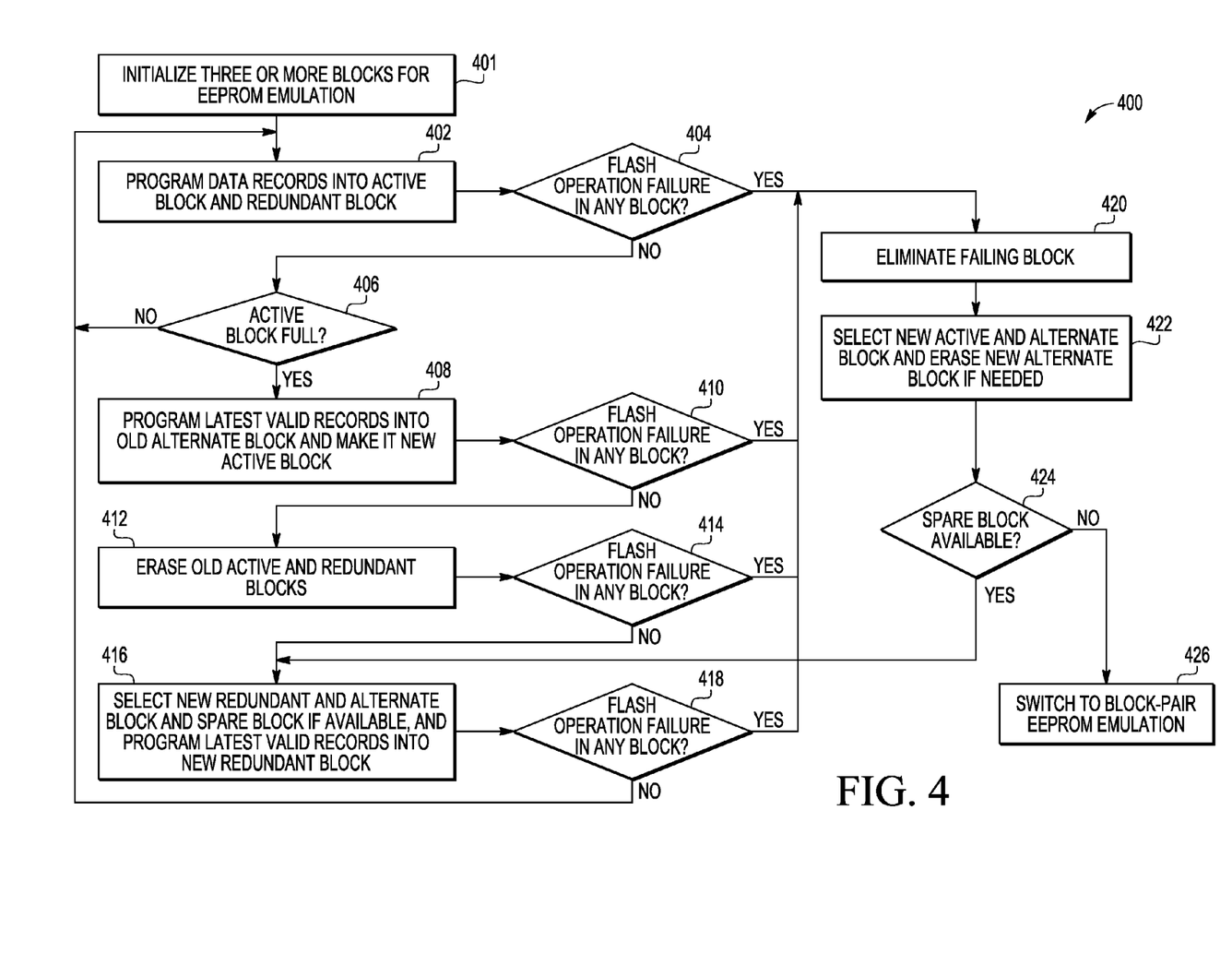
FIG. 4 is a simplified schematic flow chart illustrating various methods for using a flash memory to perform EEPROM emulation in accordance with selected embodiments of the invention.

To illustrate an example methodology for providing redundant flash block protection, reference is now made to FIG. 4 which shows a simplified schematic flow chart illustrating various methods 400 for using a flash memory to perform EEPROM emulation in accordance with selected embodiments of the invention. In the depicted methodology, the process begins at step 401 where three or more flash blocks are initialized for EEPROM emulation and designated as the Active, Redundant, Alternate and Spare Block(s) if available. At step 402, EEPROM data records are programmed (and updated) into the Active and Redundant blocks. If the flash operation does not fail in any block (negative outcome to decision 404), the process determines if the Active Block becomes full or does not have sufficient space to hold new data records at step 406. If the Active Block is not full (negative outcome to decision 406), the process returns to wait for the next record update request (step 402), and the process repeats.

Once the Active and Redundant Blocks become full (affirmative outcome to decision 406), the latest valid records from the Active Block (or the Redundant Block) are programmed into the Alternate Block which is then designated as the new Active flash block (step 408). If the flash operation does not fail in any flash block (negative outcome to decision 410), the process continues as the old Active and Redundant flash blocks are erased (step 412). If the flash operation does not fail in any flash block (negative outcome to decision 414), a new Redundant flash block is selected and programmed with a duplicate copy of the valid records from the Active flash block at step 416. This selection step may choose the old Active flash block to be the new Redundant flash block, the old Redundant block as the new Alternate Block, or may choose from any available spare flash block(s), if present, to implement a wear-leveling algorithm. In this way, valid records from the old Active and Redundant Blocks are transferred to new Active and Redundant Blocks when the old Active and Redundant Blocks become full. If the flash operation does not fail in any block (negative outcome to decision 418), the process returns to wait for the next record update request (step 402), and the process repeats.

Once a flash operation failure in a block is detected (affirmative outcome to any of decision steps 404, 410, 414 or 418), the failing block is eliminated from the EEPROM emulation at step 420, and the functional block containing the valid data records is then designated as the new Active flash block and the new Alternate Block is also selected and erased if needed (step 422). The process then determines if there is any additional flash block available to be designated as a new Redundant flash block. This decision may take into account the availability of any spare flash block(s), if present. If there is at least one additional flash block available (affirmative outcome to decision 424), a new Redundant Block is selected and programmed with a duplicate copy of the active records from the Active Block, and a Spare Block if available is also selected at step 416, and the process continues. However, if there is no additional flash block available (negative outcome to decision 424), the process switches to the block pair EEPROM emulation mode in which an Active and Alternate flash blocks are used to track EEPROM record data 426.

As described hereinabove with reference to selected embodiments, three or more blocks (Active Block, Alternate Block, Redundant Block and Spare Blocks if available) are used to ensure continuation of EEPROM emulation in the event of catastrophic block failure. In other embodiments, dedicated and duplicated rows are used to ensure continuation of EEPROM emulation in the event of a row failure or defect in a flash block. To illustrate an example implementation of the duplicate row scheme, reference is now made to FIG. 5 which depicts a schematic block diagram of an architecture 500 which uses a microcontroller, microprocessor, computer and other electronic device to emulate EEPROM using redundant rows in a plurality of flash memory blocks to provide redundant data backup. In an example embodiment, the EEPROM emulation system architecture 500 is implemented with a microcontroller 501 having one or more CPU or processor cores 502 coupled via one or more busses (not shown) to a flash memory module 504 and RAM module 506, depending on the type of data being stored. Instead of including an EEPROM memory, the flash memory module 504 includes an EEPROM emulation module 510 which provides the functionality of EEPROM memory while masking the restrictions of the actual flash array 504. In selected embodiments, the EEPROM emulation module 510 may be implemented as software, hardware, firmware or any combination of the foregoing to provide the flash memory 504 with emulated EEPROM functionalities, such as organizing data records, initializing and de-initializing EEPROM, reporting EEPROM status, and reading, writing, and deleting data records. The EEPROM emulation module 510 provides EEPROM emulation by using three blocks or clusters of flash memory 511, 512, 513 which are dynamically designated as Active, Alternate, and Spare Blocks. In each block, two rows are dedicated to each EEPROM data record or parameter so that there are two copies of each record/parameter in each block.

Figure 5:
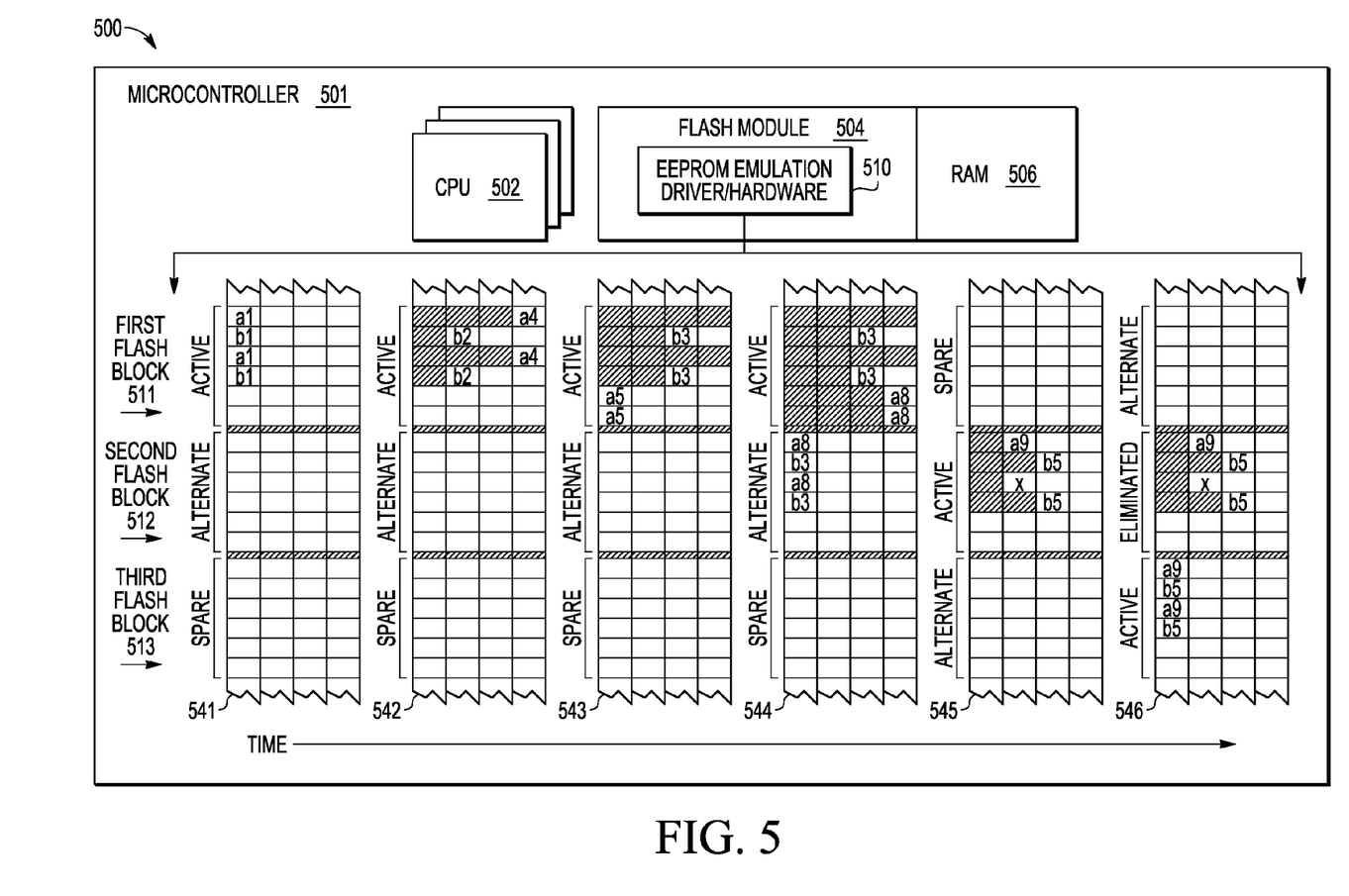
FIG. 5 is a schematic block diagram of a microcontroller architecture which implements an emulated EEPROM using redundant rows in a plurality of blocks to provide redundant data backup.

The operation of the flash blocks 511-513 to provide EEPROM emulation with duplicate row redundancy protection is depicted in FIG. 5 by illustrating the EEPROM data programming 541-546 in the first, second and third flash blocks 511-513 over time. In an initial stage (indicated with initial flash configuration 541), the EEPROM emulation module 510 designates the first flash block 511 as the Active Block, and designates the second flash block 512 as the Alternate Block. In the designated Active Block, one or more EEPROM data records (e.g., a record ID field and an associated EEPROM data field) are programmed in duplicate using two rows for each record. For example, a first record a1 is programmed into the first and third rows, while a second record b1 is programmed into the second and fourth rows. As will be appreciated, each flash block 511-513 may include additional spaces in each row for programming of additional copies of each data record.

Because the flash memory cells cannot be erased individually, the EEPROM emulation module 510 must write a new data record in duplicate with the same data ID and updated value when the data needs updating. Thus, data write operations are implemented by programming the record in duplicate at the next available or empty flash locations in the dedicated rows for that record with the new value and associated data ID value. By dedicating two rows to each record, there is provided both a regular and redundant row for storing duplicate copies of the record. In FIG. 5, an example that updates only two data records, "a" and "b," is shown. In a first write stage (indicated with flash configuration 542), the original duplicate record locations for EEPROM data record value a1 have been invalidated (as indicated with the black boxes), and a new EEPROM data value a4 is programmed into the Active Block in duplicate as a new record in the fourth column of the first and third rows in the first flash block 511. With this example, the numeric portion "4" of the data record a4 indicates that the original EEPROM data record "a" has been updated three times, with the original EEPROM data value being identified as a1, the first updated EEPROM data value being identified as a2, the second updated EEPROM data value being identified as a3, and the third updated EEPROM data value being identified as a4. That is, a[x] represent different copies/values of the same record "a," and b[x] represent different copies/values of the same record "b." The first write stage at flash configuration 542 also shows that the original duplicate record locations for EEPROM data record value b1 have been invalidated (as indicated with the black boxes), and that an updated EEPROM data value b2 is programmed into the Active Block in duplicate as a new record in the second cell of the second and fourth rows in the first flash block 511. Invalidating a data record can be implemented by simply updating a status field of the data record, so that no flash block erase is required. With this approach, there will be several data records in the Active Block with same data ID (because of data updating), so the reading routine should identify the latest copy of the data record by scanning the entire active cluster from the first data record to the blank region, and checking the latest valid one as the final value of specific data.

As shown in flash configurations 542 and 543, each record/parameter is updated along its dedicated duplicate rows. If a flash memory block has additional rows available for programming, the EEPROM emulation module 510 can dedicate the additional rows to a data record that uses up an assigned set of duplicate rows. In flash configuration 543, this is illustrated with reference to the updated EEPROM data values a5 and b3. Since the updated EEPROM data value b2 has been updated only once, it is programmed into the Active Block in duplicate as a new record b3 in the third cell of the second and fourth rows in the first flash block 511. However, the updated EEPROM data value a5 can not fit into the first and third rows of first flash block 511, so the updated EEPROM data value a5 is programmed in duplicate into new rows of the Active Block (e.g., the first cell of the fifth and sixth rows in the first flash block 511).

After updating several times, the Active Block may not have enough free space to write duplicate copies of a new data record. In FIG. 5, this is represented by the subsequent write stage (indicated with flash configuration 544) which shows that at least the original record locations for the original and updated EEPROM data values a1-a7 have been invalidated (as indicated by black boxes), and that new EEPROM data value a8 has been programmed in duplicate into the last available cell of the last available row in the first flash block 511. As will be appreciated, the EEPROM emulation module 510 determines when the Active Block (the first flash block 511) becomes full or does not have sufficient space to hold new data records. It then copies all of the latest valid data records from the Active Block to the Alternate Block (the second flash block 512). In the example of FIG. 5 (configuration 544), this is indicated with each of the latest EEPROM data records a8 and b3 being programmed in duplicate in the first column of the Alternate Block (e.g., the second flash block 512) so that the first updated record parameter a8 is programmed into the first and third rows, while the second updated record parameter b3 is programmed into the second and fourth rows. Once the data records are copied to the Alternate Block, a round-robin block swapping procedure may be used to redesignate the original active, alternate and Spare Blocks as new active, alternate and Spare Blocks. Afterwards and as indicated with flash configuration 545, the EEPROM emulation module 510 erases the Active Block (the first flash block 511) and switches the block designations so that the Alternate Block becomes the new Active Block, and the old Active Block becomes the new Spare Block, and the old Spare Block becomes the new Alternate Block. In this way, the "used" flash block 511 is reclaimed, the EEPROM data are compressed with only latest valid copies are duplicated in the new Active Block, and the program/erase cycles are evenly distributed across the flash blocks used for EEPROM emulation.

At this point, the EEPROM emulation operation continues to operate by updating/swapping duplicate record data between the Active and Alternate Blocks for so long as no program, erase or read failures are detected in any of the flash blocks. However, upon detecting a failure to program, erase or read data in any duplicate row of a flash block, the EEPROM emulation module 510 eliminates or disables the block where the failure occurred from device operation and reverts back to block pair EEPROM emulation mode. The elimination may be implemented by updating a block status field for the block where the error is detected (e.g., second flash block 512). For example, FIG. 5 shows an update flash configuration 545 after the duplicate record locations for EEPROM data values b3 and b4 have been invalidated (as indicated with the black boxes), and that an updated EEPROM data value b5 is programmed into the Active Block in duplicate as a new record in the third column of the second and fourth rows in the second flash block 512. Flash configuration 545 also shows that a failure was detected when the updated EEPROM data value a9 is programmed into the Active Block in duplicate. In particular, the duplicate record locations for EEPROM data value a8 have been invalidated, and the updated EEPROM data value a9 is programmed into the second column of the first row in the second flash block 512, but not in the third row where the failure to read, program or erase occurred (as indicated by the "x").

After eliminating or disabling the block containing the defective row cell, the EEPROM emulation module 510 copies or programs the valid active records/parameters from the functional row of the Active Block into the Alternate Block (e.g., third flash block 513) which is then designated the new Active Block, thereby overcoming the data loss that would otherwise occur. In FIG. 5, this is indicated with flash configuration 546 where the Active Block at 512 is now designated an Eliminated Block, and where the current EEPROM data record values (e.g., a9 and b5) have been copied or programmed in duplicate into the new Active Block in the third flash block 513. The old Spare Block (first block 511) becomes the new Alternate Block, and the EEPROM emulation continues with the block pair.

Figure 6:
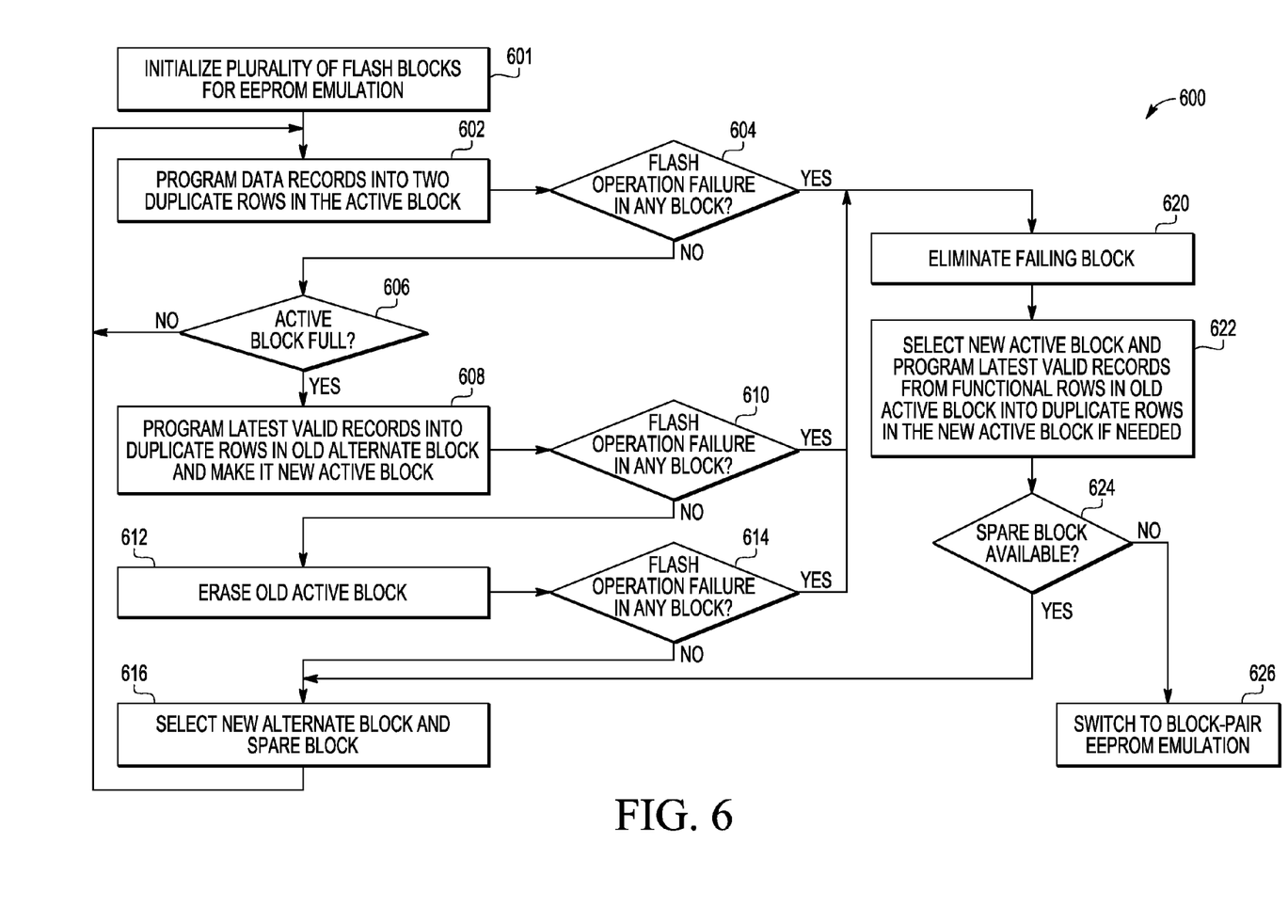
FIG. 6 is a simplified schematic flow chart illustrating various methods for using redundant rows in flash memory blocks to perform EEPROM emulation in accordance with selected embodiments of the invention.

To illustrate an example methodology for providing redundant row protection, reference is now made to FIG. 6 which shows a simplified schematic flow chart illustrating various methods 600 for using redundant rows in flash memory blocks to perform EEPROM emulation in accordance with selected embodiments of the invention. In the depicted methodology, the process begins at step 601 where a plurality of flash blocks are initialized for EEPROM emulation and designated as at least the Active and Alternate Blocks, if not also a Spare Block. At step 602, EEPROM data records are programmed (and updated) into two duplicate rows in the Active Block. The data records are updated along their dedicated duplicate rows and two new rows will be allocated in the Active Block for each data record when the current two rows are full. If the flash operation does not fail in any block (negative outcome to decision 604), the process determines if the Active Block has become full or not have sufficient space to hold new data records at step 606. If the Active Block is not full (negative outcome to decision 606), the process returns to wait for the next data record update request (step 602), and the process repeats.

Once the Active Block becomes full (affirmative outcome to decision 606), the latest valid records from the Active Block are programmed into duplicate rows of the Alternate Block which is then designated as the new Active Block (step 608). If the flash operation does not fail in any block (negative outcome to decision 610), the old Active Block is erased (step 612). If the flash operation does not fail in any block (negative outcome to decision 614), the process continues with selecting the new Alternate Block and Spare Block 616, and returns to wait for the next data record update request (step 602).

Once a failing flash block is detected (affirmative outcome to any of decision steps 604, 610 and 614), the failing block is eliminated from EEPROM emulation at step 620. In addition, a new Active Block is selected and the latest valid records from the functional rows in old Active Block are programmed in duplicate into duplicate rows in the new Active Block if needed (step 622). The process then determines if there is any additional spare flash block available (step 624). This decision may take into account the availability of any spare flash block(s), if present. If there is at least one additional spare flash block available (affirmative outcome to decision 624), the new Alternate Block and Spare Block are selected (step 616), and the process returns to wait for the next data record update request (step 602) and the process repeats. However, if there is no additional flash block available (negative outcome to decision 624), the process switches to the block pair EEPROM emulation mode in which an Active and Alternate flash blocks are used to track EEPROM record data 626. Note that records may still be programmed and updated in dedicated duplicate rows even in the block pair EEPROM emulation mode. However, once one of the two flash blocks fails, the block pair EEPROM emulation cannot continue and has to stop with failure, though the duplicate rows may provide a chance to recover the valid records from functional rows to avoid data loss in this case.

By now it should be appreciated that there is provided herein a method and apparatus for emulating EEPROM memory in flash memory. As disclosed, first and second data units of flash memory to be used for EEPROM emulation are designated as a record data unit and a redundant data unit, respectively. In selected embodiments, the first and second data units of flash memory are each implemented with a set of rows in a block of flash memory so that the record data unit is a set of record rows and the redundant data unit is a set of redundant rows. In other embodiments, the first and second data units of flash memory are each implemented with a block of flash memory so that the record data unit is a record block and the redundant data unit is a redundant block. A first set of EEPROM data records are stored to the record data unit, and a second set of EEPROM data records are stored as a duplicate of the first set of EEPROM data records to the redundant data unit. Over time, the first and second sets of EEPROM data records are updated in the record data unit and redundant data unit, respectively. Upon detecting that any block containing the record data unit and/or redundant data unit is full or does not have sufficient space to hold one or more new records, a round-robin block swapping procedure is performed with one or more additional data units of flash memory in one or more additional blocks of flash memory. When the record and redundant data units are implemented with separate flash blocks, the round-robin block swapping procedure may be performed by copying a latest valid copy of the EEPROM data records from the record data unit (or the redundant data unit) to an alternate data unit of flash memory, erasing the record data unit and redundant data unit, designating the record data unit as a new redundant data unit, designating the alternate data unit as a new record data unit, designating the redundant data unit as a new alternate data unit, and copying the latest valid copy of the EEPROM data records to the new redundant data unit. When the record and redundant data units are implemented with duplicate rows in a first flash block, the round-robin block swapping procedure may be performed by copying a latest valid copy of the EEPROM data records from the record data unit or the redundant data unit to an alternate record data unit and an alternate redundant data unit of flash memory which are located in an alternate block of flash memory, erasing the record data unit and redundant data unit by erasing a block of flash memory, designating the alternate record data unit as a new record data unit, and designating the alternate redundant data unit as a new redundant data unit. In connection with any programming and/or erase operations, flash operations in the first and second data units of flash memory may be monitored to detect a failing data unit in which there is a flash operation failure so that a first flash block containing the failing data unit can be eliminated from the round-robin block swapping procedure, and so that a data unit that did not have a flash operation failure can be designated as a new record data unit.

In another form, there is provided a method and apparatus for emulating EEPROM memory in flash memory. As disclosed, first, second and third blocks of flash memory to be used for EEPROM emulation are designated as active, redundant, and alternate block, respectively. A first set of EEPROM data records (e.g., EEPROM data records with associated file system information) is stored or programmed to a first block of flash memory designated as an Active Block, and a second set of EEPROM data records (e.g., EEPROM data records with associated file system information) is stored or programmed as a duplicate of the first set of EEPROM data records to a second block of flash memory designated as a Redundant Block. Over time, the first and second sets of EEPROM data records are updated in the first and second blocks of flash memory, such as by storing or programming updated EEPROM data records with associated file system information to the first and second blocks of flash memory. Upon detecting that the Active and/or Redundant Blocks are full or do not have sufficient space to hold new records, a round-robin block swapping procedure is performed among the first, second and third blocks of flash memory and one or more spare blocks of flash memory if available. In selected embodiments, the round-robin block swapping procedure is performed copying a third set of valid EEPROM data records from the first or second blocks of flash memory to the third block of flash memory designated as the alternate block; erasing the first and second blocks of flash memory; designating the third block of flash memory as a new active block; designating one of the first or second blocks of flash memory as a new redundant block and designating the other of the first or second blocks of flash memory as a new alternate block; and copying the third set of valid EEPROM data records to the new redundant block. In other embodiments, the round-robin block swapping procedure may be performed by copying a third set of valid EEPROM data records from the first or second blocks of flash memory to the third block of flash memory designated as the alternate block; erasing the first block of flash memory; designating the first block of flash memory as a new redundant block; copying the third set of valid data records to the new redundant block; erasing the second block of flash memory; and designating the third block of flash memory as a new active block designating the second block of flash memory as a new alternate block. To provide redundancy protection against data failure, failing blocks are detected by monitoring flash operations in the first, second or third blocks of flash memory to detect a flash operation failure so that the failing block can be eliminated from the round-robin block swapping procedure and so that one of the first, second or third blocks of flash memory that did not have a flash operation failure can be designated as a new active block. The failing flash block can be eliminated by monitoring and updating block failing flags stored in reserved locations in non-volatile memory locations that are not used by EEPROM emulation. In addition, another of the first, second or third blocks of flash memory that did not have a flash operation failure can be designated as a new alternate block for use with the new active block in a block pair EEPROM emulation. Thus, an available spare block of flash memory can be designated as a new redundant block so that a fourth set of valid EEPROM data records from the first or second blocks of flash memory that did not have a flash operation failure can be copied in duplicate to the new active block and to the new redundant block.

In yet another form, there is provided a method and apparatus for emulating EEPROM memory in flash memory. In the disclosed methodology and apparatus, first and second flash blocks are initialized and designated to be active and alternate blocks, respectively. In the first flash block designated as the active block, one or more data records (e.g., EEPROM data records with associated file system information) are stored in duplicate in a first row and a second duplicate row dedicated to that data record. Over time each of the one or more data records in the first flash block are updated by programming update data records in duplicate along the first row and the second duplicate row dedicated to each said data record, such as by storing or programming updated EEPROM data records with associated file system information to duplicate rows in the active block of flash memory. In selected embodiments, the data records in the first flash block are updated by allocating two new rows for a data record when the first row and second duplicate row are full and continue updating the data record in duplicate along the two new rows. Upon detecting the first flash block is full or does not have sufficient space to hold new records, a round-robin block swapping procedure is performed with the first and second flash blocks and any available additional flash block, such as one or more additional or spare flash blocks. In selected embodiments, the round-robin block swapping procedure is performed by identifying whichever of the first row or the second duplicate row in the first flash block contains correct data and then copying the latest valid data records from the first flash block to the second flash block so that each data record in the second flash block is stored in duplicate in a first row and a second duplicate row in the second flash block, followed by erasing the first flash block, designating the second flash block as a new active block, and designating the first flash block or a spare flash block as a new alternate block. To provide redundancy protection against data failure, failing blocks are detected by monitoring flash operations in first, second and third flash blocks that are designated to be active, alternate, and spare blocks, respectively, to detect a failing block in which there is a flash operation failure. The failing block is then eliminated from the round-robin block swapping procedure, such as by monitoring and updating block failing flags stored in reserved locations in non-volatile memory locations that are not used by EEPROM emulation. In addition, one of the first, second or third flash blocks that did not have a flash operation failure is designated as a new active block; another of the first, second or third flash blocks that did not have a flash operation failure is designated as a new alternate block; and a latest valid data records are copied from the first row or second duplicate row in the first flash block that did not have a flash operation failure to the new active block, where each data record is stored in duplicate in the new active block in a first row and a second duplicate row dedicated to that data record. In addition, an additional flash block may be designated as a new spare block after detecting a flash failing block in the first, second, or third flash blocks.

Although the described exemplary embodiments disclosed herein are directed to a method and apparatus for preventing data loss during EEPROM emulation by providing one or more redundant flash memory blocks, the present invention is not necessarily limited to the example embodiments which illustrate inventive aspects of the present invention that are applicable to a wide variety of EEPROM emulation schemes. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of emulating EEPROM memory in flash memory, comprising:
   storing a first set of EEPROM data records to a first data unit of flash memory that is designated as a record data unit;
   storing a second set of EEPROM data records as a duplicate of the first set of EEPROM data records to a second data unit of flash memory that is designated as a redundant data unit;
   updating the first and second sets of EEPROM data records in the record data unit and redundant data unit, respectively; and
   upon detecting that any block containing the record data unit or redundant data unit is full or does not have sufficient space to hold one or more new records, performing a round-robin block swapping procedure with one or more additional data units in one or more additional blocks of flash memory.

2. The method of claim 1, where each of the first and second data units of flash memory is a set of rows in a block of flash memory, such that the record data unit comprises a set of record rows and the redundant data unit comprises a set of redundant rows.

3. The method of claim 1, where performing the round-robin block swapping procedure comprises:
   copying a latest valid copy of the EEPROM data records from the record data unit or the redundant data unit to an alternate record data unit and an alternate redundant data unit of flash memory, where the alternate record data unit and alternate redundant data unit are located in an alternate block of flash memory,
   erasing the record data unit and redundant data unit by erasing a block of flash memory,
   designating the alternate record data unit as a new record data unit, and
   designating the alternate redundant data unit as a new redundant data unit.

4. The method of claim 1, where each of the first and second data units of flash memory is a block of flash memory, such that the record data unit comprises a record block and the redundant data unit comprises a redundant block.

5. The method of claim 1, where performing the round-robin block swapping procedure comprises:
   copying a latest valid copy of the EEPROM data records from the record data unit or the redundant data unit to an alternate data unit of flash memory,
   erasing the record data unit and redundant data unit,
   designating the alternate data unit as a new record data unit,
   designating one of the record data unit or the redundant data unit as a new redundant data unit and designating the other of the record data unit or the redundant data unit as a new alternate data unit, and
   copying the latest valid copy of the EEPROM data records to the new redundant data unit.

6. The method of claim 1, further comprising:
   monitoring flash operations in the first and second data units of flash memory used for EEPROM emulation to detect a failing data unit in which there is a flash operation failure,
   eliminating a first flash block containing the failing data unit from the round-robin block swapping procedure, and
   designating a new data unit in a new flash block that did not have a flash operation failure as a new record data unit.

7. A method of emulating EEPROM memory in flash memory, comprising:
   designating first, second and third blocks of flash memory to be used for EEPROM emulation as active, redundant, and alternate block, respectively;
   storing a first set of EEPROM data records to the first block of flash memory designated as the active block;
   storing a second set of EEPROM data records as a duplicate of the first set of EEPROM data records to the second block of flash memory designated as the redundant block;
   updating the first and second sets of EEPROM data records in the first and second blocks of flash memory; and
   upon detecting that either the active or redundant blocks are full or do not have sufficient space to hold new records, performing a round-robin block swapping procedure among the first, second and third blocks of flash memory.

8. The method of claim 7, where performing the round-robin block swapping procedure comprises:
   copying a third set of valid EEPROM data records from the first or second blocks of flash memory to the third block of flash memory designated as the alternate block,
   erasing the first and second blocks of flash memory,
   designating the third block of flash memory as a new active block,
   designating one of the first or second blocks of flash memory as a new redundant block and designating the other of the first or second blocks of flash memory as a new alternate block, and
   copying the third set of valid EEPROM data records to the new redundant block.

9. The method of claim 7, further comprising:
   monitoring flash operations in the first, second or third blocks of flash memory used for EEPROM emulation to detect a failing block in which there is a flash operation failure,
   eliminating the failing block from the round-robin block swapping procedure, and
   designating one of the first, second or third blocks of flash memory that did not have a flash operation failure as a new active block.

10. The method of claim 9, further comprising designating another of the first, second or third blocks of flash memory that did not have a flash operation failure as a new alternate block for use with the new active block in a block pair EEPROM emulation.

11. The method of claim 9, where eliminating the failing flash block comprises monitoring and updating block failing flags stored in reserved locations in non-volatile memory locations that are not used by EEPROM emulation.

12. The method of claim 7, where performing the round-robin block swapping procedure comprises performing round-robin block swapping among the first, second and third blocks of flash memory and one or more spare blocks of flash memory.

13. The method of claim 9, further comprising:
   designating an available spare block of flash memory as a new redundant block; and
   copying in duplicate a fourth set of valid EEPROM data records from the first or second blocks of flash memory that did not have a flash operation failure to the new active block and to the new redundant block.

14. A method of emulating EEPROM memory in flash memory, comprising:
   designating first and second flash blocks to be active and alternate blocks, respectively;
   storing one or more data records to the first flash block designated as the active block, where each data record is stored in duplicate in a first row and a second duplicate row dedicated to that data record;
   updating each of the one or more data records in the first flash block by programming update data records in duplicate along the first row and the second duplicate row dedicated to each said data record: and
   upon detecting the first flash block is full or does not have sufficient space to hold new records, performing a round-robin block swapping procedure with at least the first and second flash blocks.

15. The method of claim 14, where performing a round-robin block swapping procedure comprises:
   copying a latest valid copy of the one or more data records from the first flash block to the second flash block designated as the alternate block so that each data record in the second flash block is stored in duplicate in a first row and a second duplicate row in the second flash block;
   erasing the first flash block;
   designating the second flash block as a new active block; and
   designating the first flash block or a spare flash block as a new alternate block.

16. The method of claim 14, further comprising:
   monitoring flash operations in first, second and third flash blocks that are designated to be active, alternate, and spare blocks, respectively, to detect a failing block in which there is a flash operation failure;
   eliminating the failing block from the round-robin block swapping procedure,
   designating one of the first, second or third flash blocks that did not have a flash operation failure as a new active block;
   designating another of the first, second or third flash blocks that have a flash operation failure as a new alternate block; and
   copying a latest valid copy of the one or more data records from the first row or second duplicate row in the first flash block that did not have a flash operation failure to the new active block, where each data record is stored in duplicate in the new active block in a first row and a second duplicate row dedicated to that data record.

17. The method of claim 14, where storing the one or more data records to the first flash block comprises storing each of one or more EEPROM data records with associated file system information in duplicate in the first row and the second duplicate row in the first flash block.

18. The method of claim 14, where updating each of the one or more data records in the first flash block comprises programming updated EEPROM data records with associated file system information along duplicate rows in the active block.

19. The method of claim 16, where copying a latest valid copy of the one or more data records to the new active block comprises identifying whichever of the first row or the second duplicate row in the first flash block contains correct data.

20. The method of claim 14, where performing the round-robin block swapping procedure comprises performing round-robin block swapping among the first, second and third flash blocks and one or more spare flash blocks.

21. The method of claim 16, further comprising designating an additional flash block as a new spare block after detecting a failing block in the first, second, or third flash blocks.

22. The method of claim 16, where eliminating the failing block from the round-robin block swapping procedure comprises monitoring and updating block failing flags stored in reserved locations in non-volatile memory locations that are not used by EEPROM emulation.

23. The method of claim 14, where updating each of the one or more data records in the first flash block comprises allocating two new rows for a data record when the first row and second duplicate row are full and continue updating the data record in duplicate along the two new rows.

* * * * *